US011408670B2

(12) United States Patent
Cunningham

(10) Patent No.: US 11,408,670 B2
(45) Date of Patent: Aug. 9, 2022

(54) DEVICES FOR COOLING BEVERAGES

(71) Applicant: Taylor Cunningham, Beaverton, OR (US)

(72) Inventor: Taylor Cunningham, Beaverton, OR (US)

(*) Notice: Subject to any disclaimer, the term of this patent is extended or adjusted under 35 U.S.C. 154(b) by 401 days.

(21) Appl. No.: 16/714,026

(22) Filed: Dec. 13, 2019

(65) Prior Publication Data

US 2020/0191475 A1   Jun. 18, 2020

Related U.S. Application Data

(60) Provisional application No. 62/779,487, filed on Dec. 14, 2018.

(51) Int. Cl.
| | | |
|---|---|---|
| *F25D 31/00* | (2006.01) | |
| *F25B 9/06* | (2006.01) | |
| *B65D 8/00* | (2006.01) | |
| *B65D 25/08* | (2006.01) | |
| *A23L 2/54* | (2006.01) | |
| *B65D 81/20* | (2006.01) | |
| *B65D 81/32* | (2006.01) | |

(52) U.S. Cl.
CPC ............ *F25D 31/002* (2013.01); *B65D 7/04* (2013.01); *B65D 25/08* (2013.01); *F25B 9/06* (2013.01); *F25D 31/003* (2013.01); *A23L 2/54* (2013.01); *A23V 2002/00* (2013.01); *B65D 81/2053* (2013.01); *B65D 81/3255* (2013.01)

(58) Field of Classification Search
CPC ................ F25D 31/002; F25D 31/003; F25D 2331/808; F25D 3/107; B65D 7/04; B65D 25/08; B65D 81/2053; B65D 81/3255; F25B 9/06; A23L 2/54; A23V 2002/00

See application file for complete search history.

(56) References Cited

U.S. PATENT DOCUMENTS

| | | | | | |
|---|---|---|---|---|---|
| 3,269,141 | A | * | 8/1966 | Weiss | F25D 3/107 62/294 |
| 3,520,148 | A | * | 7/1970 | Fuerle | F25D 3/107 62/294 |
| 3,597,937 | A | * | 8/1971 | Parks | F25D 3/107 62/294 |
| 3,803,867 | A | * | 4/1974 | Willis | F25D 3/107 62/294 |
| 3,862,548 | A | * | 1/1975 | Ladany | F25D 3/107 62/294 |

(Continued)

*Primary Examiner* — Emmanuel E Duke

(57) ABSTRACT

Devices for cooling beverages in cooperation with a compressed gas cartridge. The devices include a housing, a head, a working fluid, and a release mechanism. The housing defines a chamber complementarily configured with the compressed gas cartridge to receive the compressed gas cartridge. The head couples to the housing and defines an interior void in fluid communication with the chamber. The working fluid is contained with the interior void of the head. The release mechanism is operably connected to the housing and configured to selectively release compressed gas from the compressed gas cartridge into the interior void of the head. The compressed gas cools the working fluid when the compressed gas is selectively released from the compressed gas cartridge and contacts the working fluid in the interior void. The head is configured to be placed in a beverage to cool the beverage.

20 Claims, 6 Drawing Sheets

(56) References Cited

U.S. PATENT DOCUMENTS

| | | | | |
|---|---|---|---|---|
| 4,628,703 | A | * | 12/1986 | Kim ................ F25D 3/107 62/294 |
| 4,640,102 | A | * | 2/1987 | Tenenbaum .......... F25D 31/007 62/294 |
| 4,656,838 | A | * | 4/1987 | Shen ................ F25D 3/107 62/294 |
| 4,784,678 | A | * | 11/1988 | Rudick ............... F25D 5/02 206/217 |
| 4,843,836 | A | * | 7/1989 | Childers ............ A47G 21/007 62/457.4 |
| 6,910,338 | B2 | * | 6/2005 | Boukas ............... F25B 19/00 62/86 |
| 2008/0029543 | A1 | * | 2/2008 | Leufgen ............. B67D 1/0861 222/400.7 |
| 2013/0103127 | A1 | * | 4/2013 | Muller ............... F25D 9/00 607/107 |
| 2015/0000329 | A1 | * | 1/2015 | Lopez ................ F25D 3/107 62/457.9 |

\* cited by examiner

DEVICES FOR COOLING BEVERAGES

CROSS REFERENCE TO RELATED APPLICATIONS

This application claims priority to copending U.S. Application, Ser. No. 62/779,487, filed on Dec. 14, 2018, which is hereby incorporated by reference for all purposes.

BACKGROUND

The present disclosure relates generally to devices for cooling beverages. In particular, devices for cooling beverages in cooperation with compressed gas cartridges are described.

Known techniques for cooling beverages are not entirely satisfactory. Some conventional techniques rely on external power sources to run refrigeration devices. Refrigeration devices must be powered, which requires access to a power source. Fixed power sources, like a wall outlet, limit the portability of the refrigeration devices. Portable power sources, like batteries, are expensive and subject to depletion. Refrigeration devices are also relatively large, heavy, and slow. Undesirably, it takes significant time for a room temperature beverage to be cooled with refrigeration devices.

Other current techniques for cooling beverages involve adding ice or pre-cooled materials, such as whisky stones, to a beverage. Utilizing ice requires maintaining a supply of ice at a temperature below the freezing point of water and/or waiting considerable time for water to freeze into ice in a freezer. Transporting ice is not convenient because it must be stored in a cooler and is prone to melting. Ice also dilutes beverages as it melts, which can unsatisfactorily alter the taste of the beverage.

Whisky stones and other pre-cooled materials avoid the beverage dilution problems of ice, but suffer similar drawbacks related to requiring significant time to be cooled to a temperature effective for cooling a beverage. Transporting whisky stones is likewise inconvenient because the whisky stones must be kept at a low temperature in a cooler to be effective to cool a beverage.

Thus, there exists a need for devices to cool beverages that improve upon and advance the design of known techniques for cooling beverages. Examples of new and useful devices for cooling beverages relevant to the needs existing in the field are discussed below.

SUMMARY

The present disclosure is directed to devices for cooling beverages in cooperation with a compressed gas cartridge. The devices include a housing, a head, a working fluid, and a release mechanism. The housing defines a chamber complementarily configured with the compressed gas cartridge to receive the compressed gas cartridge. The head couples to the housing and defines an interior void in fluid communication with the chamber. The working fluid is contained with the interior void of the head. The release mechanism is operably connected to the housing and configured to selectively release compressed gas from the compressed gas cartridge into the interior void of the head. The compressed gas cools the working fluid when the compressed gas is selectively released from the compressed gas cartridge and contacts the working fluid in the interior void. The head is configured to be placed in a beverage to cool the beverage.

DETAILED DESCRIPTION

The disclosed devices for cooling beverages will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various devices for cooling beverages are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Contextual Details

Features of items used in conjunction with the devices for cooling beverages described herein will first be described to provide context and to aid the discussion of the devices.

Beverage

Figure 1:
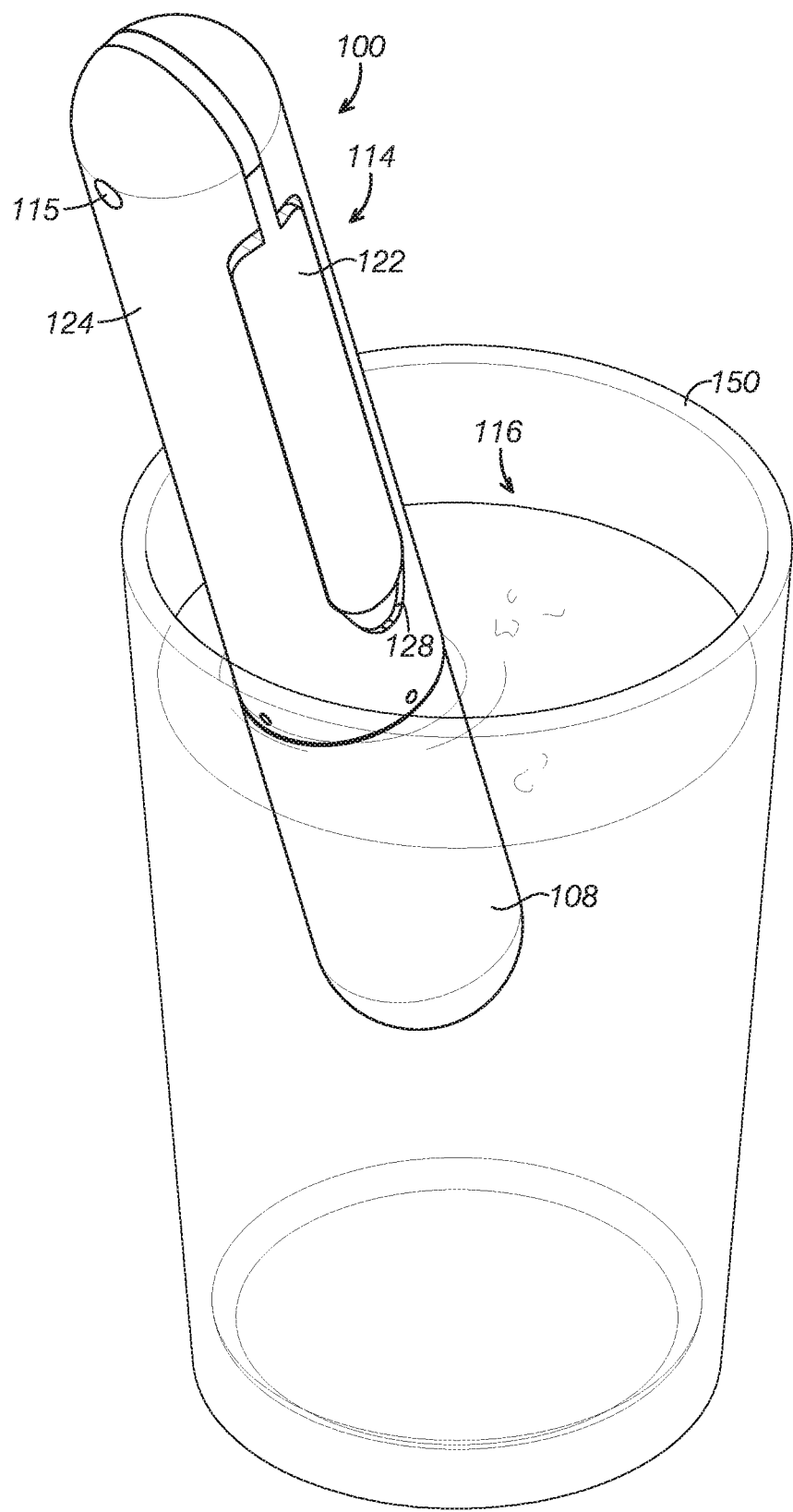
FIG. 1 is a perspective view of a device for cooling beverages with a head of the device submerged in a beverage.

The devices disclosed herein may be used to cool beverages, such as beverage 116 depicted in FIG. 1. In this document, beverage is intended to cover any liquid consumed by people or animals. Suitable beverages include water, coffee, tea, soft drinks, beer, wine, cocktails, milk, juice, and the like. The beverage cooled by the presently disclosed devices may be any currently known or later developed type of beverage.

Vessel

Beverages are typically served in a vessel, such as a cup, a glass, a bottle, or a can. FIG. 1 depicts beverage 116 contained in a glass 150. Beverages may additionally or alternatively be served or stored in a canteen, thermos, jug, or other vessel. The devices disclosed in this document may cool beverages stored in any container or vessel as long as the device may be placed in contact with the liquid or with the vessel. For example, the device may be submerged in the beverage served in a cup or glass. Alternatively, the device may be placed in contact with the outside of a metal can containing the beverage.

Compressed Gas Cartridge

Figure 2:
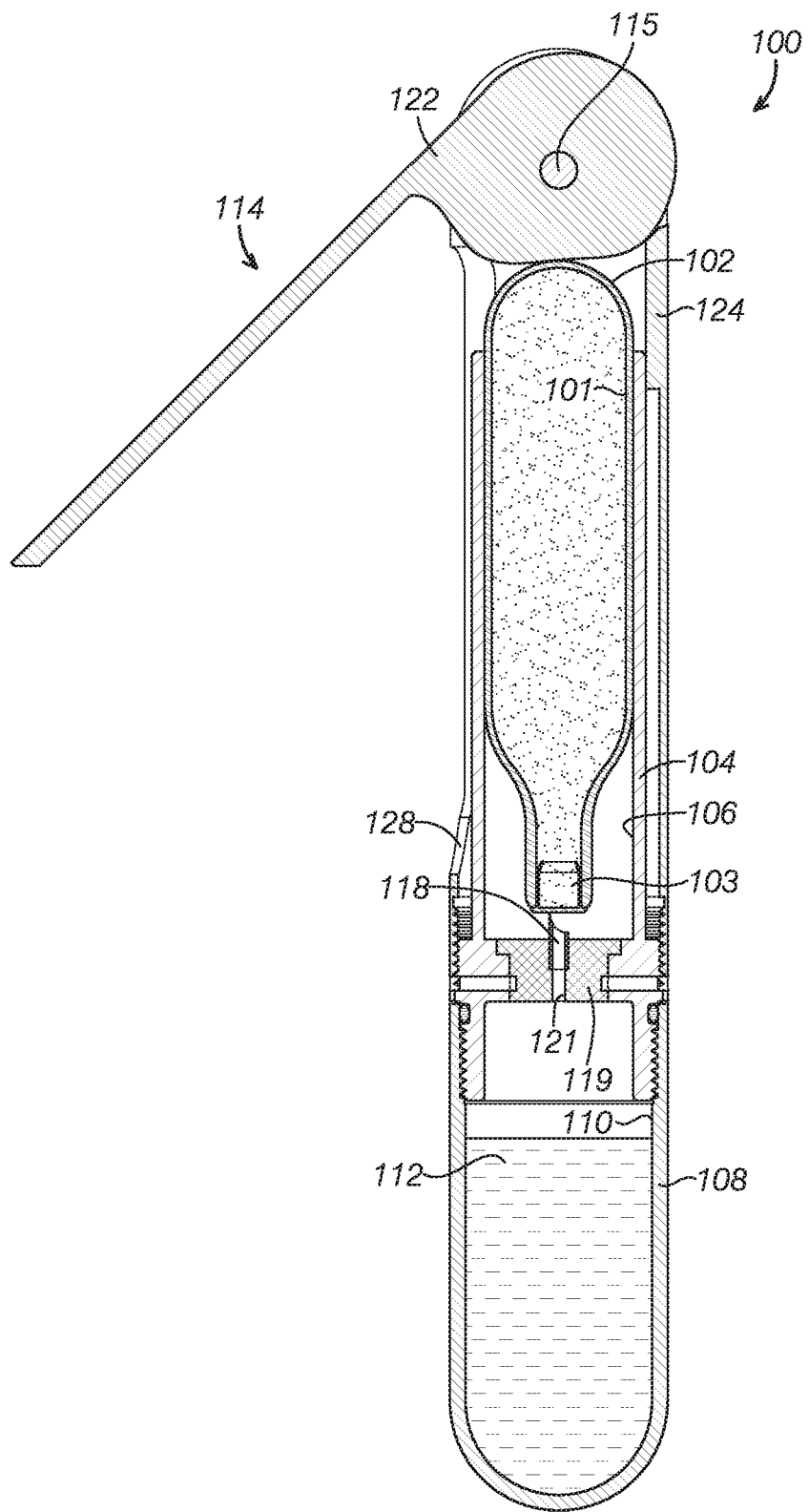
FIG. 2 is front elevation view of the device shown in FIG. 1 with a lever in a position distal from a sleeve mounted on a housing, the figure depicting in dashed lines a working fluid in a liquid state disposed in the head and a compressed gas cartridge in the chamber between the lever and a spike proximate the head.
Figure 3:
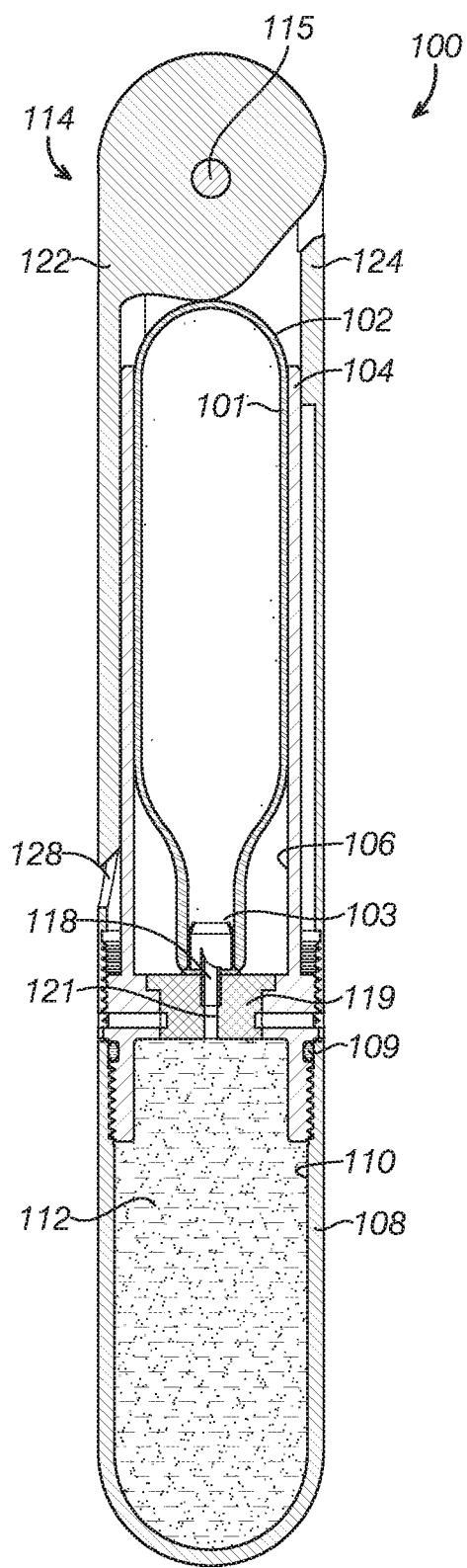
FIG. 3 is a front elevation view of the device shown in FIG. 1 with the lever in a position proximate the housing in a recess formed in the sleeve to sit flush with the sleeve, the figure depicting in dashed lines the working fluid in a frozen state and the lever pushing the compressed gas cartridge onto the spike with sufficient force that the spike pierces a seal of the compressed gas cartridge to release the compressed gas into the head through a bore in the spike.
Figure 5:
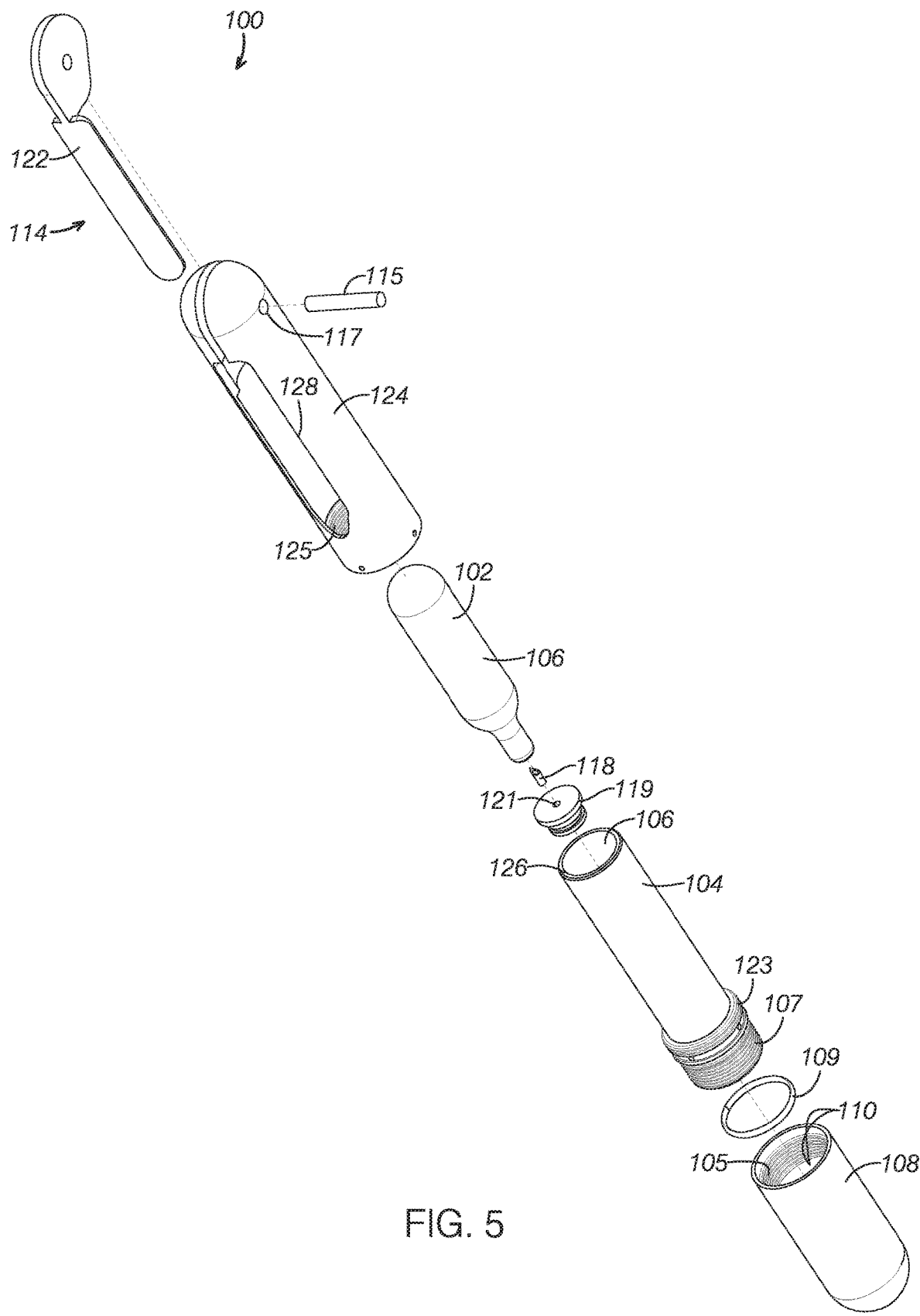
FIG. 5 is an exploded view of the device showing a head with coupling threads, a plug supporting a spike above the head, a housing above the plug, the housing having first coupling threads complementing the coupling threads of the head and second coupling threads configured to mate with a sleeve, a compressed gas cartridge above the housing, the sleeve above the housing with coupling threads configured to mate with the second coupling threads of the housing, and a lever next to the sleeve.

The devices discussed in this document are configured to cooperate with a compressed gas cartridge, such as compressed gas cartridge 102 shown in FIGS. 2, 3, and 5. For convenience, the element or molecule stored in the cartridge is referred to as a compressed gas. However, the element or molecule will typically be in a liquid state when stored in the cartridge and exist in a gaseous state when subject to standard room temperatures and atmospheric pressures.

The compressed gas stored in the cartridge may be any element or molecule that endothermicly cools a working fluid or material surface that comes in contact with the gas when it is released from the cartridge. Suitable gases include carbon dioxide, helium, nitrogen, and oxygen. Any suitable gas may be used.

The cartridge used to store the compressed gas may be any currently known or later developed type of cartridge suitable for storing compressed gases. Carbon dioxide cartridges are one example of a suitable cartridge design. As shown in FIGS. 2, 3, and 5, compressed gas cartridge 102 includes a substantially cylindrical metal shell 101 and a seal 103 designed to be punctured to release the compressed gas stored in metal shell 101. Cartridge design variations are contemplated.

Devices for Cooling Beverages

With reference to the figures, devices for cooling beverages will now be described. The devices discussed herein function to cool beverages in cooperation with a compressed gas cartridge. The reader will appreciate that the devices disclosed herein may be used to cool things other than beverages, such as a body part or bodily fluid, a food item, or an object, such as the surface of a vehicle to aid in removing a dent. More generally, the devices disclosed herein may be used to cool anything by conduction.

The reader will appreciate from the figures and description below that the presently disclosed devices address many of the shortcomings of conventional techniques for cooling beverages. For example, the presently disclosed devices do not require refrigeration devices to cool beverages. By avoiding mechanical refrigeration devices, the devices disclosed herein do not rely on power sources to operate, which makes them more portable, more convenient, or more reliable. For example, the present devices are not subject to depleted batteries or power outages. The devices disclosed in this document are also considerably smaller, lighter, and cool beverages faster than techniques involving refrigeration devices.

The presently disclosed devices also improve upon techniques involving ice or precooled materials, like whisky stones, to cool a beverage. The devices disclosed herein do not require maintaining a supply of ice at a temperature below the freezing point of water and/or waiting considerable time for water to freeze into ice in a freezer. Nor do the devices discussed in this document require maintaining materials like whiskey stones at a low temperature. As a result, the presently disclosed devices are easier to transport and faster acting than ice or whisky stone techniques. Further, the devices disclosed herein do not dilute the beverages they are used to cool like ice is prone to do.

Device Embodiment One

With reference to FIGS. 1-6, a first example of a device for cooling beverages, device 100, will now be described. Device 100 includes a housing 104, a head 108, a working fluid 112, and a release mechanism 114. In some examples, the device does not include one or more features included in device 100.

For example, some device examples do not include a working fluid or a release mechanism. Examples that do not include a working fluid operate by cooling the head itself with the release of compressed gas rather than cooling a working fluid contained in the head. Examples that do not include a release mechanism operate by cooperating with compressed gas cartridges with a nozzle installed for selectively releasing the compressed gas stored within the cartridge.

In other examples, the device includes additional or alternative features, such as temperature sensors detecting the temperature of the working fluid, the beverage, or both, and gauges or displays communicating the temperature of the working fluid, the beverage, or both. The device may include additional instrumentation to communicate other relevant information, such as the quantity of compressed gas remaining in the cartridge.

Housing

As shown in FIG. 5, housing 104 serves as a structural component supporting removably coupling to other components of device 100, including head 108 and sleeve 124. Housing 104 is substantially cylindrical and defines different sets of threads to threadingly couple with head 108 and sleeve 124. In particular, threads 107 enable housing 104 to threadingly couple with threads 105 of head 108 and threads 123 enable housing 104 to threadingly couple with threads 125 of sleeve 124.

As can be seen in FIGS. 2 and 3, housing 104 defines a chamber 106 complementarily configured with compressed gas cartridge 102. The reader can see in FIG. 5 that housing 104 defines a cartridge opening 126 opposite head 108. Cartridge opening 126 is sized to receive compressed gas cartridge 102. Cartridge opening 126 and the complementary configuration of chamber 106 and compressed gas cartridge 102 enables chamber 106 to receive compressed gas cartridge 102.

Head

In the example shown in FIGS. 1-5, head 108 is configured to be operatively cooled by the release of compressed gas from compressed gas cartridge 102 and to then cool beverage 116 by direct or indirect conduction. Head 108 may be cooled directly by the release of compressed gas from compressed gas cartridge 102. Additionally or alternatively, head 108 may be cooled indirectly by conduction with working fluid 112 contained in head 108 when working fluid 112 is cooled by the release of compressed gas from compressed gas cartridge 102.

With direct conduction, head 108 cools beverage 116 by being placed in direct contact with beverage 116, such as by submerging at least a portion of head 108 in beverage 116. With indirect conduction, head 108 cools beverage 116 by cooling one or more intermediate materials and then cools the beverage in a chain of conduction. An example of indirect conduction with a beverage would be placing head 108 in contact with a thin metal wall of a beverage can to first cool the metal wall by conduction with head 108 and to then cool the beverage by conduction between the metal wall and the beverage.

As can be seen in FIGS. 1-5, head 108 is coupled to housing 104. In particular, head 108 is removably coupled to housing 104 and a gasket 109 is disposed between head 108 and sleeve 124. In the particular example shown in the figures, head 108 is threadingly coupled to housing 104. In other examples, the head is removably coupled to the housing by a friction fit, magnetic attraction, or a detent mechanism. In some examples, the head is permanently or semi-permanently coupled to the housing.

Head 108 defines an interior void 110 in fluid communication with chamber 106. Interior void 110 contains working fluid 112. The compressed gas from compressed gas cartridge 102 received in chamber 106 cools working fluid 112 when the compressed gas is selectively released from compressed gas cartridge 102 and contacts working fluid 112 in interior void 110.

To more effectively conduct heat away from beverage 116 to cooled working fluid 112, head 108 is comprised of a material selected to have a thermal conductivity coefficient greater than 10 W/(m*K). Further, head 108 is comprised of a material selected to resist corrosion when submerged in beverage 116. In the particular example showy in the figures, head 108 is comprised of metal, specifically stainless steel. However, the head may be comprised of any currently known or later developed material, metal or otherwise, effective to transfer heat.

Working Fluid

Working fluid 112 functions to cool beverage 116 by conduction through head 108 in direct or indirect thermal contact with beverage 116 after being cooled itself by the release of compressed gas from compressed gas cartridge 102. In the particular example shown in FIGS. 1-6, working fluid 112 is selected to freeze when compressed gas is released into interior void 110 of head 108 from compressed gas cartridge 102. In the present example, working fluid 112 is water, but the working fluid may be any currently known or later developed fluid effective to exchange heat.

As shown in FIGS. 1 and 2, working fluid 112 is contained with interior void 110 of head 108. The volume of the interior void and the volume of the working fluid may be selected to provide a desired amount of cooling to the beverage. Likewise, the volume of compressed gas, the size of the compressed gas cartridge, and the size of the chamber may be selected to provide a desired amount of cooling to the beverage. The volume of compressed gas and the volume of working fluid may be cooperatively selected to allow a desired amount of the working fluid to freeze upon releasing the compressed gas from the compressed gas cartridge.

Release Mechanism

Release mechanism 114 is configured to selectively release compressed gas from compressed gas cartridge 102 into interior void 110 of head 108. In typical operation, a user will use release mechanism 114 to selectively release compressed gas from compressed gas cartridge 102 into interior void 110 and then bring head 108 into thermal contact with beverage 116 to cool beverage 116. The ability to selectively release compressed gas enables the user to conveniently transport stored cooling capacity in the form of a sealed compressed gas cartridge and to rapidly cool a beverage when desired by releasing the compressed gas from the cartridge with the release mechanism.

The reader can see in FIGS. 2-6 that release mechanism 114 includes a spike 118, a lever 122, a pivot 115, and a sleeve 124. Release mechanism 114 is operably connected to housing 104. More specifically, sleeve 124 of release mechanism 114 is complementarily configured with housing 104 to receive housing 104 within sleeve 124 and is threadingly coupled to housing 104. Sleeve 124 covers cartridge opening 126 when housing 104 is received in sleeve 124. Housing 104 is configured to be selectively removed from inside sleeve 124 to insert or remove compressed gas cartridge 102 into chamber 106 of housing 104.

Spike 118 is configured to pierce seal 103 of compressed gas cartridge 102 to release the compressed gas from compressed gas cartridge 102. As can be seen in FIGS. 1-5, spike 118 is disposed in chamber 106 proximate where head 108 couples to housing 104. With reference to FIGS. 2, 3, and 5, the reader can see that spike 118 is supported in a port 121 formed in a plug 119, which is disposed in chamber 106 proximate head 108.

Figure 6:
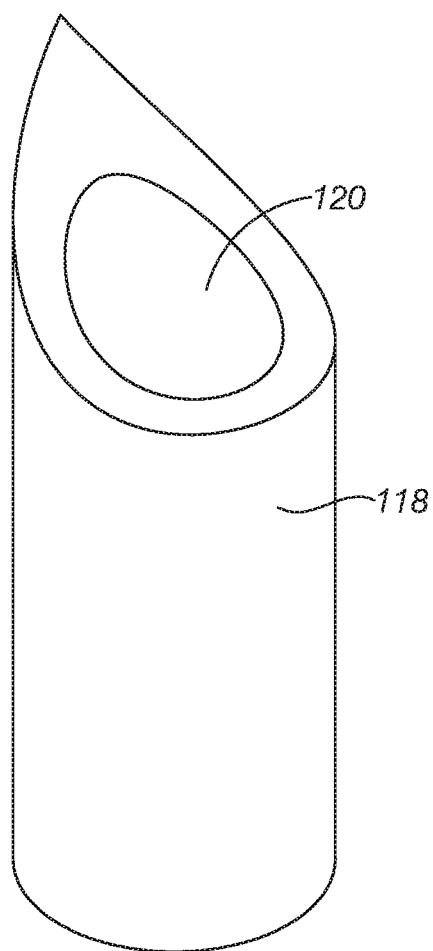
FIG. 6 is a perspective view of the spike depicting a hollow bore running through the spike.

With reference to FIG. 6, spike 118 defines a bore 120 providing fluid communication between chamber 106 and interior void 110 via port 121 of plug 119. In FIG. 2, the compressed gas is depicted as high concentration dots within compressed gas cartridge 102. In FIG. 3, the compressed gas is depicted as lower concentration dots in both compressed gas cartridge 102 and interior void 110. Comparing FIGS. 2 and 3, the reader can see that once spike 118 pierces seal 103 of compressed gas cartridge 102 as depicted in FIG. 3, compressed gas releases through bore 120 and port 121 into interior void 110 and cools working fluid 112.

Lever 122 functions to press compressed gas cartridge 102 in chamber 106 against spike 118 with force sufficient for spike 118 to pierce seal 103 of compressed gas cartridge 102. Lever 122 is operatively connected to housing 104. In particular, lever 122 is pivotally connected via pivot 115 to sleeve 124, which receives and is threadingly coupled to housing 104. Sleeve 124 defines a bearing 117 in which pivot 115 resides.

Figure 4:
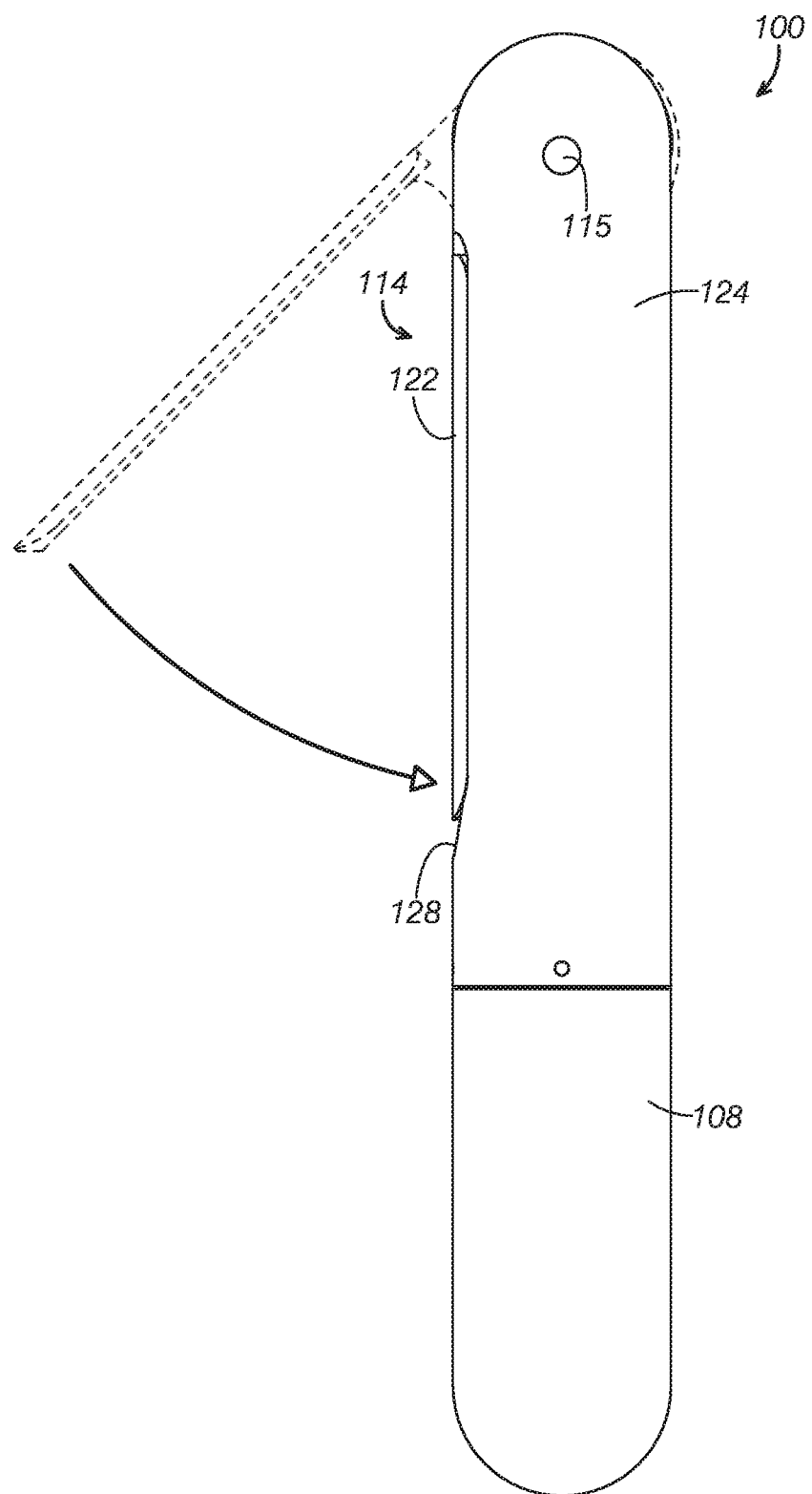
FIG. 4 is a side elevation view of the device shown in FIG. 1 depicting the lever in the recess of the sleeve in solid lines and in a position pivoted from the housing in dashed lines.

Pivoting lever 122 about pivot 115 from the extended position shown in dashed lines in FIG. 4 to the recessed position proximate to sleeve 124 shown in solid lines in FIG. 4 functions to press compressed gas cartridge 102 against spike 118. In some examples, in addition or alternatively to a lever, the release mechanism includes a tab, button, or handle configured to press the cartridge against the spike directly or in cooperation with other components.

As shown in FIGS. 4 and 5, sleeve 124 defines a recess 128 complementarily configured with lever 122 to receive lever 122 when lever 122 is pivoted proximate to sleeve 124. In the present example, lever 122 is flush with an outer profile of sleeve 124 when lever 122 is received in recess 128. Recess 128 and lever 122 being flush with outer profile of sleeve 124 facilitates carrying, holding, using, and storing device 100. The recess is not present in all examples of devices to cool beverages and in some examples the lever abuts the sleeve rather than sitting in a recess.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A device for cooling beverages in cooperation with a compressed gas cartridge, comprising:
   a head defining an interior void;
   a working fluid contained with the interior void of the head; and
   a release mechanism operably connected to the head and configured to selectively release compressed gas from the compressed gas cartridge into the interior void of the head;
   wherein:
      the compressed gas cools the working fluid when the compressed gas is selectively released from the compressed gas cartridge and contacts the working fluid in the interior void; and
      the head is configured to be placed in a beverage to cool the beverage.

2. The device of claim 1, wherein the release mechanism includes a spike configured to pierce the compressed gas cartridge to release the compressed gas from the compressed gas cartridge.

3. The device of claim 2, wherein the spike is disposed proximate to the housing.

4. The device of claim 3, wherein the spike defines a bore in fluid communication with the interior void.

5. The device of claim 4, wherein the release mechanism further includes a lever operable to press the compressed gas cartridge against the spike with force sufficient for the spike to pierce the compressed gas cartridge.

6. The device of claim 5, wherein the release mechanism further includes a sleeve complementarily configured with the compressed gas cartridge to receive the compressed gas cartridge within the sleeve.

7. The device of claim 6, wherein the lever is pivotally connected to the sleeve.

8. The device of claim 7, wherein the sleeve defines a recess complementarily configured with the lever to receive the lever when the lever is pivoted proximate to the sleeve.

9. The device of claim 6, wherein the head is comprised of stainless steel.

10. The device of claim 5, wherein the lever is flush with an outer profile of the sleeve when the lever is received in the recess.

11. The device of claim 1, wherein the head is configured to selectively disconnect from the release mechanism.

12. The device of claim 1, wherein the head is comprised of a material selected to have a thermal conductivity coefficient greater than 10 W/(m*K).

13. The device of claim 1, wherein the head is comprised of a material selected to resist corrosion when submerged in a beverage.

14. The device of claim 1, wherein the head is comprised of metal.

15. The device of claim 1, wherein the working fluid is water.

16. The device of claim 1, wherein the working fluid is selected to freeze when compressed gas is released into the interior void of the head from the compressed gas cartridge.

17. A device for cooling beverages in cooperation with a compressed gas, the device comprising:
   a housing defining a chamber configured to contain the compressed gas;
   a head coupled to the housing, the head defining an interior void in fluid communication with the chamber;
   a working fluid contained with the interior void of the head; and
   a release mechanism operably connected to the housing and configured to selectively release compressed gas from the chamber into the interior void of the head;
   wherein:
      the compressed gas cools the working fluid when the compressed gas is selectively released from the chamber and contacts the working fluid in the interior void; and
      the head is configured to be placed in a beverage to cool the beverage.

18. The device of claim 17, wherein the release mechanism includes a bore in fluid communication with the interior void.

19. The device of claim 18, wherein the bore is disposed proximate to where the head couples to the housing.

20. The device of claim 19, wherein the release mechanism further includes a lever operable to insert the bore into the chamber to fluidly connect the chamber and the interior void.

* * * * *